United States Patent
Park et al.

(10) Patent No.: US 9,096,438 B2
(45) Date of Patent: Aug. 4, 2015

(54) NANO-DIAMOND DISPERSION SOLUTION AND METHOD FOR PREPARING SAME

(75) Inventors: Tae Hee Park, Seoul (KR); Kyu Tae Lee, Gyeonggi-Do (KR); Jung Suk Lee, Gyeonggi-Do (KR)

(73) Assignee: NEOENBIZ, Gyeonggi-Do (KR)

( * ) Notice: Subject to any disclaimer, the term of this patent is extended or adjusted under 35 U.S.C. 154(b) by 419 days.

(21) Appl. No.: 13/578,424

(22) PCT Filed: Feb. 11, 2011

(86) PCT No.: PCT/KR2011/000957
§ 371 (c)(1),
(2), (4) Date: Aug. 10, 2012

(87) PCT Pub. No.: WO2011/099823
PCT Pub. Date: Aug. 18, 2011

(65) Prior Publication Data
US 2012/0304545 A1    Dec. 6, 2012

(30) Foreign Application Priority Data

Feb. 12, 2010  (KR) .................. 10-2010-0013485
Feb. 10, 2011  (KR) .................. 10-2011-0011931

(51) Int. Cl.
*B24D 3/00* (2006.01)
*B24D 11/00* (2006.01)
*B24D 18/00* (2006.01)
*B24D 3/02* (2006.01)
(Continued)

(52) U.S. Cl.
CPC ........... *C01B 31/065* (2013.01); *B01J 13/0008* (2013.01); *B01J 13/0026* (2013.01); *B01J 13/0034* (2013.01); *B01J 13/0086* (2013.01); *B82Y 30/00* (2013.01); *C09D 7/1216* (2013.01); *C10M 125/02* (2013.01); *C10N 2250/12* (2013.01)

(58) Field of Classification Search
USPC ............................................. 51/293, 307, 308
See application file for complete search history.

(56) References Cited

U.S. PATENT DOCUMENTS 3,762,882 A * 10/1973 Grutza .................... 428/615
7,300,958 B2 * 11/2007 Kataoka et al. .................. 516/32
(Continued)

FOREIGN PATENT DOCUMENTS

CN    101454074    6/2009
JP    2005-001983    1/2005
(Continued)

OTHER PUBLICATIONS

Office Action corresponding to Chinese Patent Application No. 201180016999.3, issued Oct. 18, 2013—with English Translation.
(Continued)

*Primary Examiner* — James McDonough
(74) *Attorney, Agent, or Firm* — Lathrop & Gage LLP

(57) ABSTRACT

The present invention relates to a nano-diamond dispersion solution and a method of preparing the same. The method of preparing a nano-diamond dispersion solution comprises the following steps: providing a nano-diamond aggregation; mixing the nano-diamond aggregation with a metal hydroxide solution and stirring the mixture such that the nano-diamond aggregation is separated, to obtain a mixture solution; stabilizing the mixture solution such that the mixture solution is separated into a supernatant and precipitates; and extracting the supernatant and precipitates.

8 Claims, 8 Drawing Sheets

(51) Int. Cl.
  *C09K 3/14* (2006.01)
  *C09C 1/68* (2006.01)
  *C01B 31/06* (2006.01)
  *C09D 7/12* (2006.01)
  *B82Y 30/00* (2011.01)
  *B01J 13/00* (2006.01)
  *C10M 125/02* (2006.01)

(56) References Cited

U.S. PATENT DOCUMENTS

2010/0034857 A1* 2/2010 Launag et al. .............. 424/401
2010/0261926 A1* 10/2010 Komatsu et al. ............. 558/87
2010/0298600 A1* 11/2010 Lee ............................. 562/523

FOREIGN PATENT DOCUMENTS

| KR | 1020070105711 A | 10/2007 |
| KR | 1020080093625 A | 10/2008 |
| KR | 1020090037774 A | 4/2009 |
| WO | WO 2007/112805 | 10/2007 |
| WO | WO 2009/048268 | 4/2009 |
| WO | WO 2009/060613 | 5/2009 |

OTHER PUBLICATIONS

Search Report corresponding to European Patent Application No. 11 74 2515, completed Nov. 21, 2013.
World Patents Index Database No. XP002715870. Week 200934. *Thompson Scientific.* London, Great Britain. AN 2009-J36628.

* cited by examiner (a)          (b)

NANO-DIAMOND DISPERSION SOLUTION AND METHOD FOR PREPARING SAME

TECHNICAL FIELD

The present invention relates to a nano-diamond dispersion solution and a method of preparing the same, and more particularly, to a nano-diamond dispersion solution of uniformly distributed nano-diamond particles having a size of several nanometers to several tens of nanometers.

CROSS-REFERENCE TO THE RELATED APPLICATIONS

This application is the U.S. national stage application under 35 U.S.C. §371 of International Application No. PCT/KR2011/000957, filed Feb. 11, 2011, which claims the benefit of Korean Patent Application No. 10-2010-0013485, filed on Feb. 12, 2010, and Korean Patent Application No. 10-2011-0011931, filed on Feb. 10, 2011, in the Korean Intellectual Property Office, the disclosures of which are incorporated herein in their entirety by reference.

BACKGROUND ART

Due to advantages such as high hardness, transmittance of broadband light, chemical stability, high thermal conductivity, low thermal expansion, electrical insulating properties, biocompatibility, and eco-friendliness, nano-diamond is applicable in a variety of industrial fields such as the electronic, chemical, and medical industries. Synthetic diamond powder having a size of micrometers has been widely used in many industries.

With recent breakthroughs in nanotechnology, research into nano-diamond having a very small particle diameter has been conducted. Nano-diamond particles having an average particle diameter of from about 5 nm to about 10 nm may be obtained in a very short explosion time under an extremely high pressure.

Nano-diamond particles prepared to have an average particle diameter of from about 5 nm to about 10 nm are nano-diamond aggregations with surfaces covered with a disordered graphite layer. These nano-diamond particle aggregations may have a variety of chemical and structural characteristics depending on a chemical treatment method.

Nano-diamond has unique electrical, chemical, and optical characteristics, such as small particle size, large surface area, high mechanical strength, and adjustable surface activity. However, nano-diamond particles tend to form aggregations due to increased attraction between particles resulting from a large surface area, and thus there is a limit to prepare nano-diamond having a particle diameter of tens of nanometers or less.

DETAILED DESCRIPTION OF THE INVENTION

Technical Problem

The present invention provides a method of preparing a nano-diamond dispersion of uniformly dispersed nano-diamond particles having a size of several is nanometers to tens of nanometers.

The present invention provides a nano-diamond dispersion prepared using the method.

The present invention provides a sealing agent for anodization, a plating additive, a polishing agent, an oil additive, a polymer resin additive, and a heat-dissipating additive that each include the nano-diamond dispersion prepared using the above-described method.

Technical Solution

According to an aspect of the present invention, there is provided a method of preparing a nano-diamond dispersion, the method including: providing a nano-diamond aggregation; mixing the nano-diamond aggregation and an aqueous metal hydroxide solution while agitating to prepare a mixture solution in order to disintegrate the nano-diamond aggregation; stabilizing the mixture solution to be separated into a supernatant and a precipitate; and extracting the supernatant and the precipitate respectively from the mixture solution.

The method may further include, after the extracting of the supernatant and the precipitate from the mixture solution, drying the supernatant to obtain nano-diamond powder; and mixing the nano-diamond powder with a dispersion solvent.

The method may further include, after the extracting of the supernatant and the precipitate from the mixture solution, adding the precipitate back into the mixture solution while agitating.

The preparing of the mixture solution may further include disintegrating the nano-diamond aggregation using a centrifuge, a ball mill, a bead mill, or an ultrasonicator.

The aqueous metal hydroxide solution may include at least one of potassium (K), calcium (Ca), sodium (Na), magnesium (Mg), aluminum (Al), zinc (Zn), iron (Fe), nickel (Ni), tin (Sn), and lead (Pb).

The aqueous metal hydroxide solution may be NaOH, KOH, or a mixture thereof.

The preparing of the mixture solution may include chemically binding a metal ion is in the aqueous metal hydroxide solution and a reactive group in the nano-diamond aggregation.

The reactive group may include at least one of a carboxyl group (—COOH), a hydroxyl group (—OH), an alcohol group ($CH_2OH$), an amine group (—$NH_2$), an amide group (—$NHCOCH_3$), an amide group (—CONH), a sulfone group ($COSO_3H$), a sulfonyl chloride group ($COSO_2Cl$), a methyl group (—$CH_3$), an aldehyde group (—CHO), and an ether group (—O—).

According to an aspect of the present invention, there is provided a nano-diamond dispersion prepared using any of the above-described methods and including nano-diamond particles having a particle size of from about 1 nm to about 100 nm dispersed in a dispersion solvent.

The nano-diamond particles may have an average particle diameter of from about 9 nm to about 90 nm.

The nano-diamond particles may include a metal ion and a reactive group chemically bonded to a surface thereof.

The nano-diamond particles may further include a metal hydroxide adsorbed on a surface thereof.

The dispersion solvent may include at least one of water, distilled water, alcohol, oil, an organic solvent, hydrogen peroxide, ammonia water, toluene, xylene, ethylene glycol, methylethylketone (MEK), and n-methyl pyrrolidone (NMP).

According to an aspect of the present invention, there is provided a sealing agent for use in anodization, including a nano-diamond dispersion prepared using any of the above-described methods and including nano-diamond particles having a particle size of from about 1 nm to about 100 nm dispersed in a dispersion solvent.

The nano-diamond particles in the sealing agent may have an average particle diameter of from about 9 nm to about 90 nm.

The nano-diamond particles in the sealing agent may include a metal ion and a functional group chemically bonded to a surface thereof.

The nano-diamond particles in the sealing agent may further include a metal hydroxide adsorbed on a surface thereof.

According to an aspect of the present invention, there is provided a polishing is agent including a nano-diamond dispersion prepared using any of the above-described methods and including nano-diamond particles having a particle size of from about 1 nm to about 100 nm dispersed in a dispersion solvent.

According to an aspect of the present invention, there is provided an oil additive including a nano-diamond dispersion prepared using any of the above-described methods and including nano-diamond particles having a particle size of from about 1 nm to about 100 nm dispersed in a dispersion solvent.

According to an aspect of the present invention, there is provided a polymer resin additive including a nano-diamond dispersion prepared using any of the above-described methods and including nano-diamond particles having a particle size of from about 1 nm to about 100 nm dispersed in a dispersion solvent.

Advantageous Effects

According to the embodiments of the present invention, using the method of preparing a nano-diamond dispersion described above, a nano-diamond dispersion of uniformly dispersed nano-diamond particles having a particle size of from about 1 nm to about 100 nm may be obtained.

According to the one or more embodiments of the present invention, the nano-diamond dispersion itself may be used as a coating material, a lubricating oil additive, a plating material, such as a sealing agent in anodization, or an additive in plating or surface treatment with nickel, chromium, gold, silver, or the like. The nano-diamond dispersion may be added to polymer plastic, a paint additive, a material for heat-dissipating products, ceramic hybrid, textile, paper, toothpaste, shampoo, soap, cosmetics, or the like to improve functionality. Furthermore, a surface functionalized nano-diamond compound may be used as a starting material in preparing a nanobio material-based pharmaceutical material.

A nano-diamond composition prepared by using a matrix of the nano-diamond colloid dispersion such as a polymer resin, a synthetic polymer, a protein, a metal, an alloy or the like may be applicable to a promising composite material due to the inclusion of diamond having inherent advantageous characteristics. In the is nano-diamond dispersions according to the embodiments of the present invention, nano-diamond particles are uniformly dispersed and not clustered or aggregated together, and thus have an increased contact area with matrix. This may result in an effective mixing.

BEST MODE

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
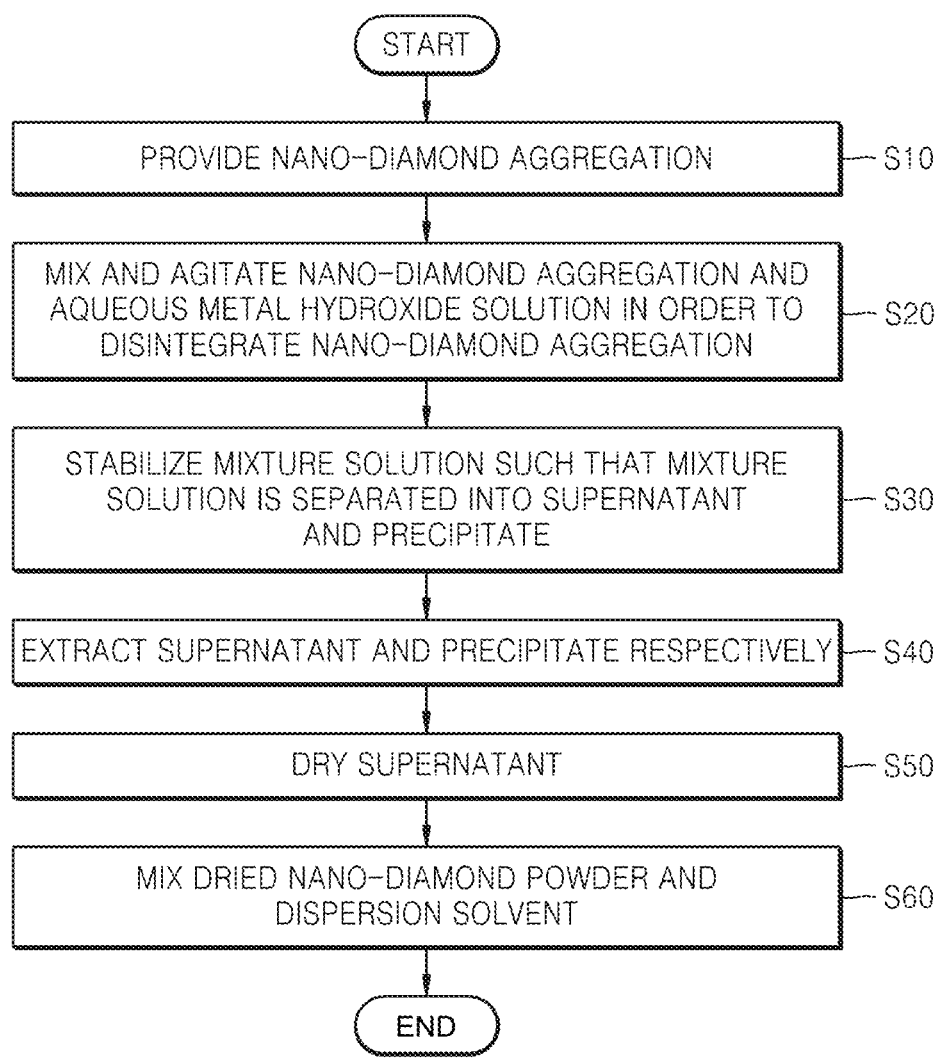
FIG. 1 is a flowchart of a method of preparing a nano-diamond dispersion, according to an embodiment of the present invention.
Figure 2:
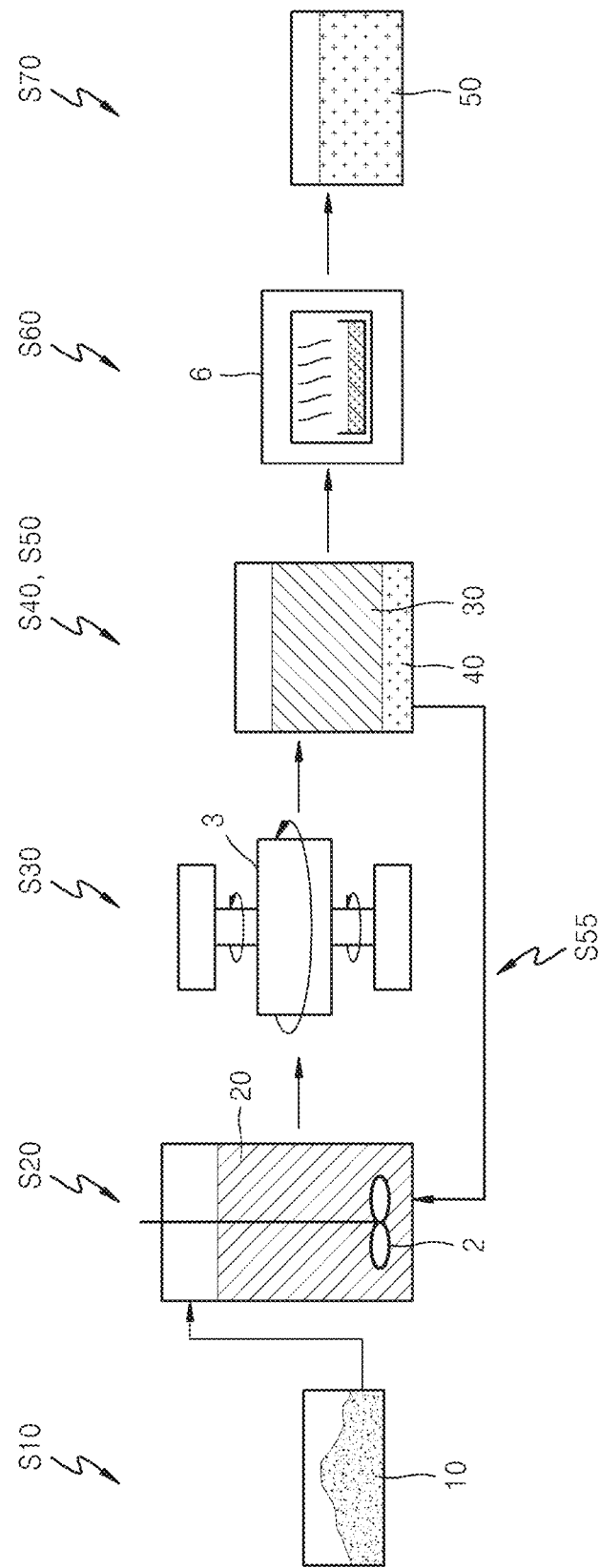
FIG. 2 is a schematic diagram illustrating the method of preparing a nano-diamond dispersion in FIG. 1.

FIG. 1 is a flowchart of a method of preparing a nano-diamond dispersion, according to an embodiment of the present invention. FIG. 2 is a schematic diagram illustrating the method of preparing a nano-diamond dispersion in FIG. 1.

Referring to FIGS. 1 and 2, a nano-diamond aggregation 10 is provided (S10). The nano-diamond aggregation 10 may be prepared using any one of a high-temperature high-pressure method, a shock-wave method, chemical vapor deposition (CVD), and an explosion method. For example, according to the explosion method, nano-diamond aggregations may be prepared in a high-temperature high-pressure atmosphere induced by exploding an explosive such as trinitrotoluene (TNT), or a research department explosive (RDX) as a white, crystalline, water-insoluble bomb. The nano-diamond aggregation 10 may have a size of several hundreds of nanometers to several thousands of nanometers. In addition, impurities such as cluster carbon or regenerated surface graphite may be removed from the nano-diamond aggregation 10 by using an acid, for example, nitric acid or hydrochloric acid.

To disperse the nano-diamond aggregation 10, the nano-diamond aggregation 10 may be mixed with an aqueous solution of metal hydroxide while agitating to obtain a mixture solution 20 (S20). A metal component in the metal hydroxide may be any element that has a higher ionization tendency than hydrogen H. For example, the metal component may be at least one of potassium (K), calcium (Ca), sodium (Na), magnesium (Mg), aluminum (Al), zinc (Zn), iron (Fe), nickel (Ni), tin (Sn), and lead (Pb). The aqueous solution of metal hydroxide may include, for example, NaOH, KOH, or a mixture thereof. The metal hydroxide may change surface characteristics of the is nano-diamond. For example, a reaction mechanism of the nano-diamond and the metal hydroxide may be represented by Formula 1 below, wherein "M" denotes a metal element.

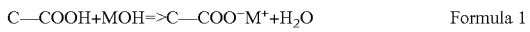

$$C-COOH+MOH => C-COO^-M^+ + H_2O \quad \text{Formula 1}$$

According to Formula 1 above, with the substitution of hydrogen with a metal ion, electrical repulsion between nano-diamond particles in the nano-diamond aggregation is increased, thus dispersibility in a solution may be increased. The larger the ionic diameter of the metal ion, the lower the initial precipitation rate. In Formula 1, a carboxyl group (—COOH) on the surface of the nano-diamond is denoted to chemically bind with the metal ions. However, the present invention is not limited thereto, and other various reactive groups may exist on the surface of the nano-diamond, for example, a hydroxyl group (—OH), an alcohol group (CH$_2$OH), an amine group (—NH$_2$), an amide group (—NH-COCH$_3$), an amide group (—CONH), a sulfone group (COSO$_3$H), a sulfonyl chloride group (COSO$_2$Cl), a methyl (—CH$_3$), an aldehyde group (—CHO), and an ether group (—O—), wherein at least some of these groups may be chemically bonded to the metal ions. Formula 2 below represents a chemical reaction when a hydroxyl group (—OH) is on the surface of the nano-diamond, wherein a hydrogen ion of the hydroxyl group (—OH) is substituted with a metal ion of a metal hydroxide.

$$C-OH+MOH => C-O^-M^+ + H_2O \quad \text{Formula 2}$$

The metal hydroxide may be adsorbed onto the surface of the nano-diamond particles by van der Waals force. The adsorbed metal hydroxide may further increase electrical repulsion between the nano-diamond particles, thus further improving dispersability in a solution.

The agitating may be performed using a common method. For example, the agitating may be achieved using a stirrer 2, such as a rod, which is placed in a solution for agitation, or using ultrasonic waves. The agitating may help the nano-diamond aggregation 10 and the aqueous metal hydroxide solution to be more uniformly mixed. The agitation temperature and time may be dependent on the size of the nano-diamond is aggregation 10 and the type of metal element used. For example, the agitating may be performed at a temperature of from about 30° C. to about 110° C., and in some embodiments, may be performed at a temperature of from about 80° C. to about 100° C. For example, the agitation time may be performed for about 1 second to about 24 hours, and in some other embodiments, may be for from about 10 hours to about 14 hours. The mixture solution 20 may have a pH of greater than 7 (i.e., alkaline), or a pH of less than 7 (i.e., acidic). For example, the mixture solution 20 may have a pH of about 8 to 10, and in some embodiments, may have a pH of about 3 to 6. This pH variation of the mixture solution 20 is attributed to that the aqueous metal hydroxide solution is alkaline and the nano-diamond aggregation 10 is acidic in general. Therefore, the pH of the mixture solution 20 is dependent on relative amounts of the aqueous metal hydroxide solution and the nano-diamond aggregation 10.

The preparation of the mixture solution 20 (S20) may further include disintegrating the nano-diamond aggregation 10 using a centrifuge, a ball mill, a bead mill, or an ultrasonicator. The nano-diamond aggregation 10 in the mixture solution 20 may be disintegrated into individual nano-diamond particles. The disintegrating may be performed using, for example, a centrifuge 3. For example, the centrifugation speed may be from about 5,000 rpm to about 20,000 rpm, and in some embodiments, may be from about 6000 rpm to about 10000 rpm. For example, the centrifugation time may be from about 1 second to about 24 hours, and in some embodiments, may be from about 1 minute to about 30 minutes. The disintegrating may be performed by ball milling or bead milling. In ball milling or bead milling, the sizes of balls or beads may range from about 0.1 mm to about 0.3 mm. The disintegrating may be performing using an ultrasonicator.

Subsequently, the mixture solution 20 is stabilized (S30). The stabilizing may include leaving the mixture solution 20 for a while without stirring or vibrating. In some embodiments, the stabilization time may be from about 1 second to about 24 hours. Through the stabilization, the mixture solution 20 may be separated into a supernatant 30 and a precipitate 40.

The supernatant 30 and the precipitate 40 are extracted from the mixture is solution 20, respectively (S40). For example, a size (e.g., particle diameter) of the nano-diamond particles in the supernatant 30 may be from about 1 nm to about 100 nm, and in some other embodiments, may be from about 5 nm to about 40 nm. The supernatant 30 may have a pH of, for example, from about 7.5 to about 8.5. A size of the nano-diamond particles in the precipitate 40 may be greater than about 40 nm. For example, the nano-diamond particles may have an average particle diameter of from about 9 nm to about 90 nm, and in some embodiments, may be from about 9 nm to about 30 nm. The average particle diameter of the nano-diamond particles may be dependent on the type and amount of chemical components included in the nano-diamond aggregation, and/or the pH of the aqueous metal hydroxide solution. In particular, the nano-diamond particles tend to have a larger average particle diameter when the aqueous metal hydroxide solution is acidic, and to have a smaller average particle diameter when the aqueous metal hydroxide solution is alkaline.

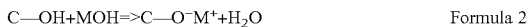

The supernatant 30 may be a nano-diamond dispersion. The supernatant 30 may contain the nano-diamond particles and the metal ions chemically bonded to the nano-diamond particles. The supernatant 30 may further include the metal hydroxide adsorbed on the surface of the nano-diamond particles.

The supernatant 30 may be dried in a furnace or a dry oven to obtain nano-diamond powder (S50). This drying is optional. For example, the drying temperature may be from about 100° C. to about 600° C., and in some embodiments, may be from about 300° C. to about 500° C. For example, the drying time may be from about 1 minute to about 24 hours, and in some embodiments, may be from about 2 hours to 3 hours. The nano-diamond powder may further contain the metal ion chemically bonded thereto, and the metal hydroxide adsorbed to the surface thereof.

The dried nano-diamond powder may be mixed with a dispersion solvent (S60). This mixing is optional. The mixing may be performed using ultrasonic waves and/or a bead milling apparatus. For example, the mixing by ultrasonication may be performed for about 1 minute to about 2 hours, and in some embodiments, may be from about 10 minutes to about 1 hour. As a result, a nano-diamond dispersion 50 is obtained. The nano-diamond dispersion 50 may have any of a variety of concentrations. The nano-diamond dispersion 50 may have a pH of about 7. For example, the is nano-diamond dispersion 50 may have a pH of about 3 to 13, and in some embodiments, may have a pH of about 6 to about 8. The nano-diamond dispersion 50 may be acidic, alkaline, or neutral. A size of the nano-diamond particles in the nano-diamond dispersion 50 may be from about 1 nm to about 100 nm, and in some embodiments, may be from about 5 nm to about 40 nm.

Non-limiting examples of the dispersion solvent are water, distilled water, alcohol, oil, organic solvent, hydrogen peroxide, and ammonia water. Non-limiting examples of the organic solvent are toluene, xylene, ethylene glycol, methylethylketone (MEK), and n-methyl pyrrolidone (NMP), which is for illustrative purposes only, and the present invention is not limited thereto.

The nano-diamond dispersion 50 may contain the nano-diamond particles and the metal ion chemically bonded to the nano-diamond. The supernatant 50 may further contain the metal hydroxide adsorbed on the surface of the nano-diamond particles.

The nano-diamond powder obtained through drying may aggregate to some extent, but may disperse when mixed with a dispersion solvent such as distilled water. This is attributed to chemical binding of the reactive groups and the metal ions on the surface of the nano-diamond powder, which enhances dispersion of the nano-diamond powder. The metal hydroxide adsorbed on the surface of the nano-diamond powder may further enhance dispersion of the nano-diamond powder.

Figure 3:
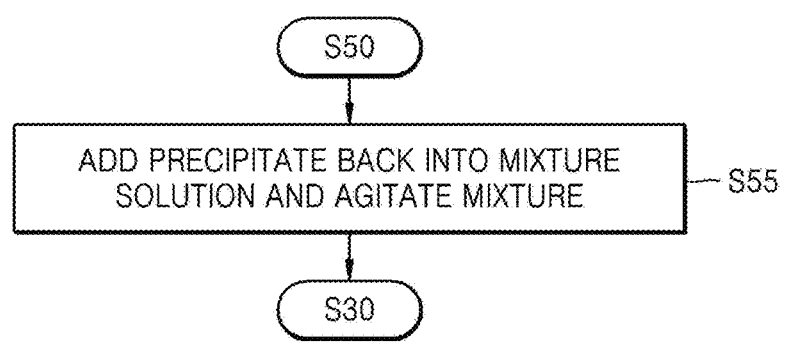
FIG. 3 is a flowchart of a method of processing a precipitate in FIG. 1.

FIG. 3 is a flowchart of a method of processing the precipitate 40 of FIG. 1.

Referring to FIG. 3, the precipitate 40 may be added back into the mixture solution 20 and agitated together (S45). The agitating may be performed in the same condition as in the preparing of the mixture solution 20 (S20), followed by the subsequent processes. This process performed on the precipitate 40 is optional.

Hereinafter, nano-diamond dispersions according to embodiments of the present invention will be described in greater detail in comparison with a mixture solution of nano-diamond aggregation.

Figure 4:
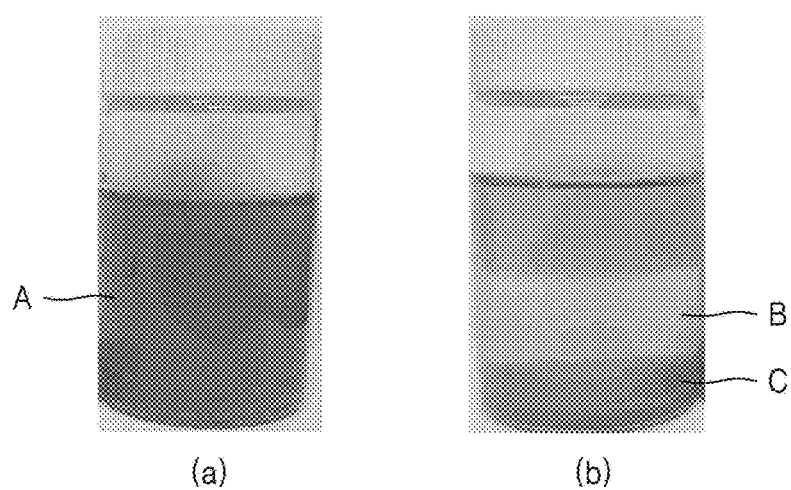
FIG. 4 shows images of a nano-diamond dispersion according to an embodiment of the present invention, and a nano-diamond aggregation solution as a comparative example.

FIG. 4 shows images of a nano-diamond dispersion according to an embodiment of the present invention, and a mixture solution of a nano-diamond aggregation as a is comparative example. In FIG. 4, (a) is an image of the nano-diamond dispersion according to an embodiment of the present invention after being left for 60 days, and (b) is an image of a solution of nano-diamond aggregation from operation S10 of FIG. 1 mixed with distilled water, as a comparative example taken after 1 day after being mixed with the distilled water. Both the nano-diamond dispersion and the nano-diamond aggregation solution were prepared to have a nano-diamond concentration of about 0.1 wt %.

Referring to FIG. 4, the nano-diamond dispersion was found to form a uniform nano-diamond dispersion in a solution (see region A) with almost no precipitate even after being left 60 days. On the contrary, the nano-diamond aggregation solution was separated into a solvent (region B) and the nano-diamond aggregation (region C) after only 1 day. Therefore, the nano-diamond dispersion according to an embodiment of the present invention may provide higher, long-term dispersion stability relative to the nano-diamond aggregation solution.

Figure 5:
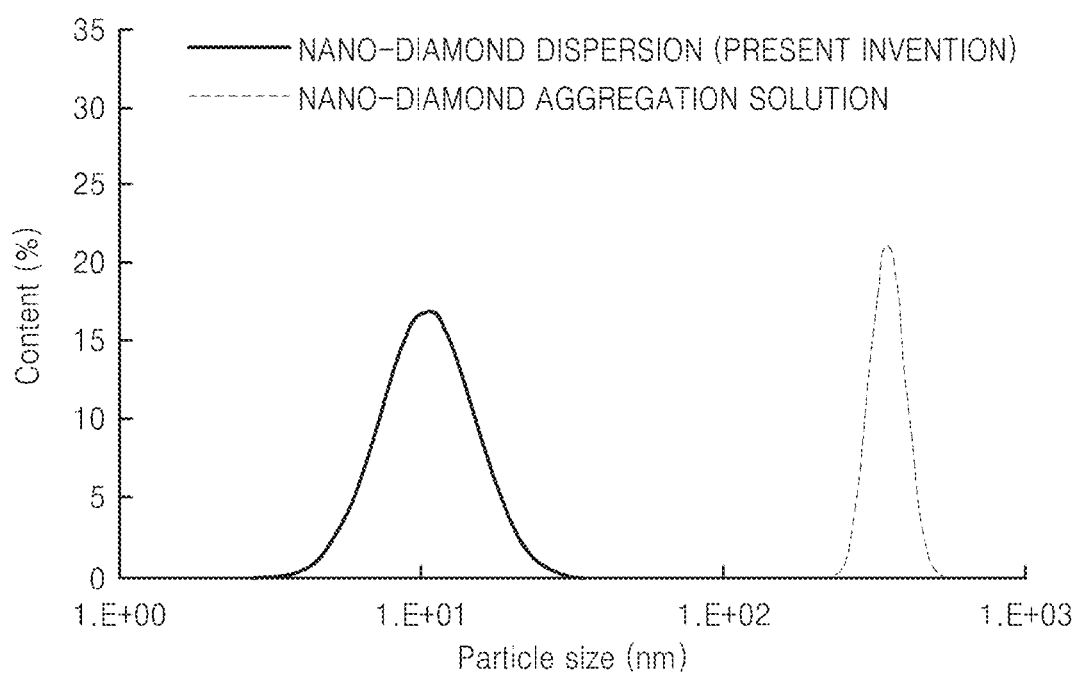
FIG. 5 is a graph comparing particle size distributions of nano-diamond particles in the nano-diamond dispersion according to an embodiment of the present invention and that of the nano-diamond aggregations in the nano-diamond aggregation solution of the comparative example.

FIG. 5 is a graph comparing particle size distributions of the nano-diamond particles in the nano-diamond dispersion according to an embodiment of the present invention and that of the nano-diamond aggregations in the nano-diamond aggregation solution. The graph of FIG. 5 illustrates a measurement result performed using a nanoparticle size analyzer. According to the operational principle of the nanoparticle size analyzer, dynamic light scattering (DLS) is used to measure the particle sizes. When particles or molecules are irradiated by a laser beam, because relatively small particles tend to be moved farther away and faster by solvent molecules, the intensity of scattered light varies in proportion to the size of particles. The particle size distribution may be obtained by calculating the speed of Brownian motion through analysis of these intensity variations.

Referring to FIG. 5, a particle size of the nano-diamond particles in the nano-diamond dispersion may be from about 1 nm to about 100 nm, and in some embodiments, may be from about 5 nm to about 40 nm, and in some other embodiments, may be about 9.95 nm on average. The term "particle size" may refer to the sizes of individual nano-diamond particles, or the sizes of clusters of the nano-diamond particles. A particle size of the nano-diamond aggregation may be from is about 200 nm to about 1000 nm, and in some embodiments, may be about 330 nm on average. According to embodiments of the present invention, the nano-diamond dispersion may contain smaller nano-diamond particles than the nano-diamond aggregation solution.

Hereinafter, a nano-diamond dispersion according to an embodiment of the present invention that is prepared from the mixture solution using sodium hydroxide (NaOH) as a metal hydroxide, and a nano-diamond dispersion as a comparative example prepared using a sodium chloride (NaCl) solution will be described in detail. According to the comparative example, in operation S20 described above, the nano-diamond aggregation was mixed with a sodium chloride (NaCl) solution to obtain a mixture solution, followed by operations S30-S60 to obtain the nano-diamond dispersion. A nano-diamond concentration of the nano-diamond dispersion was about 1 wt %. For convenient distinction, the nano-diamond dispersion according to the embodiment of the present invention is referred to as a NaOH-nano-diamond dispersion, and the nano-diamond dispersion of the comparative example is referred to as a NaCl-nano-diamond dispersion.

Table 1 is a component analysis table of the NaOH-nano-diamond dispersion and the NaCl-nano-diamond dispersion, obtained using energy dispersion spectroscopy (EDS).

TABLE 1

| Wt % | Na | Cl |
|---|---|---|
| NaOH-nano-diamond dispersion | 0.7 | None |
| NaCl-nano-diamond dispersion | 0.79 | 0.54 |

The NaOH-nano-diamond dispersion and the NaCl-nano-diamond dispersion had similar sodium contents. In addition, the NaCl-nano-diamond dispersion had a chlorine content of about 0.54 wt %, while the NaOH-nano-diamond dispersion contained no chlorine. According to the comparative example using the NaCl solution in the mixture solution, chlorine also remains in the final nano-diamond dispersion.

Figure 6:
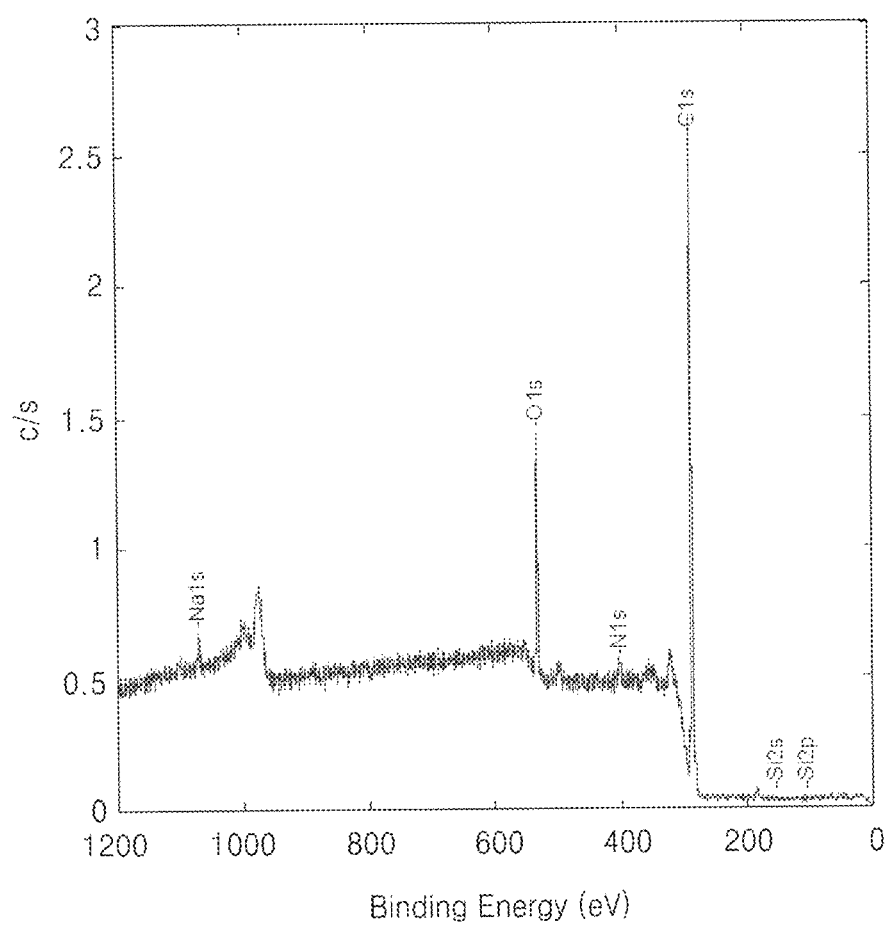
FIGS. 6 and 7 are graphs obtained from X-ray photoelectron spectroscopy on the NaOH-nano-diamond dispersion (present invention) and the NaCl-nano-diamond dispersion (comparative example), respectively.
Figure 7:
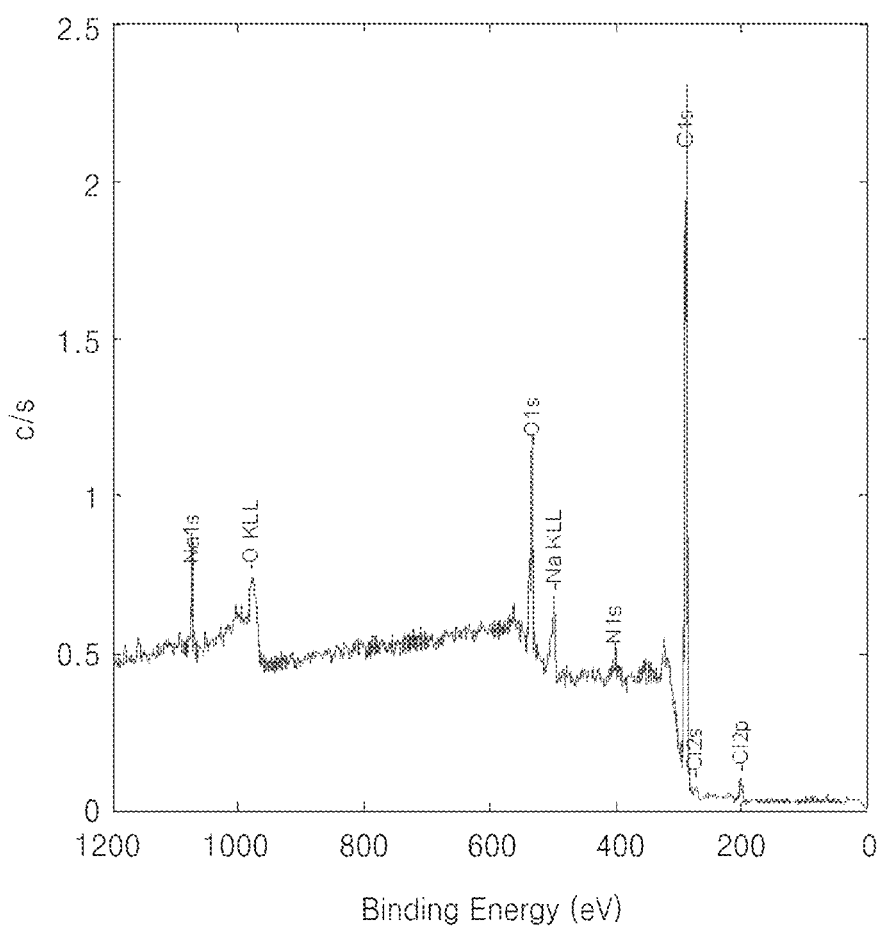

FIGS. 6 and 7 illustrate results of X-ray photoelectron spectroscopy for the NaOH-nano-diamond dispersion (present invention) and the NaCl-nano-diamond dispersion (comparative example), respectively.

Referring to FIGS. 6 and 7, there was no chlorine in the NaOH-nano-diamond dispersion, while there was chlorine in the NaCl-nano-diamond dispersion, which is the same result of the EDS described above.

Chlorine may reduce dispersibility of nano-diamond and is likely to cause a defect by oxidizing a sealed or polished material. Accordingly, it is advantageous to remove chlorine from a nano-diamond dispersion. In this regard, the NaOH-nano-diamond dispersion according to an embodiment of the present invention containing no chloride may have better characteristics than the NaCl-nano-diamond dispersion as a comparative example.

Figure 8:
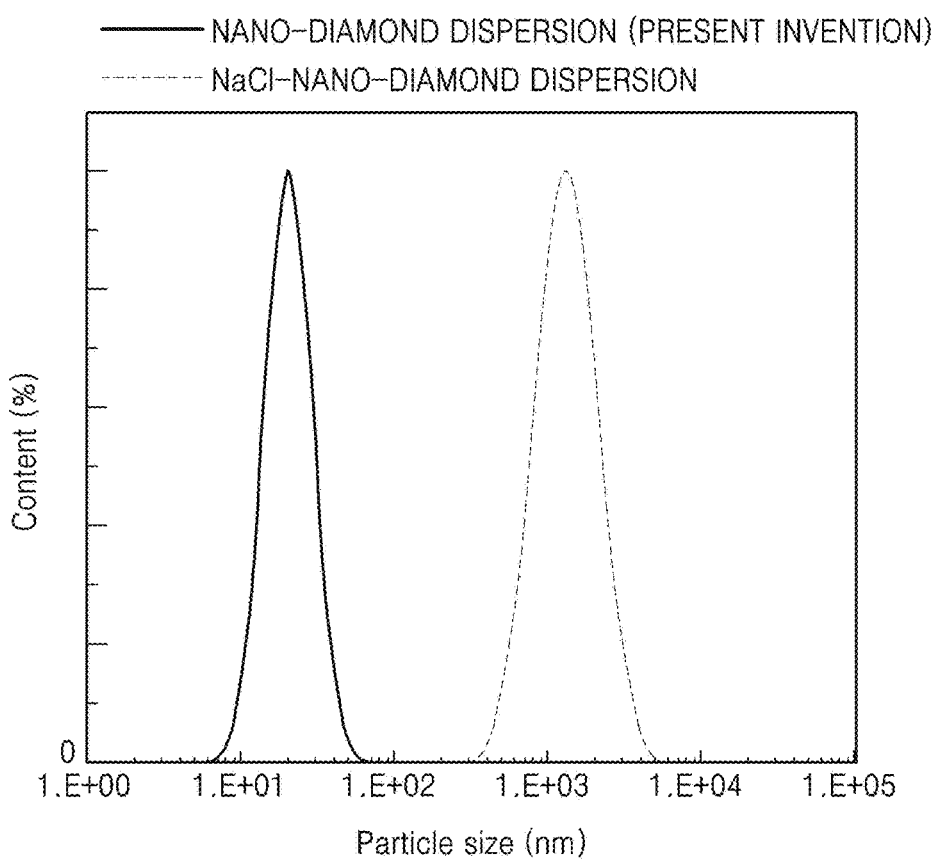
FIG. 8 is a graph of particle size distributions in a nano-diamond dispersion according to an embodiment of the present invention and a nano-diamond dispersion of a comparative example.
Figure 9:
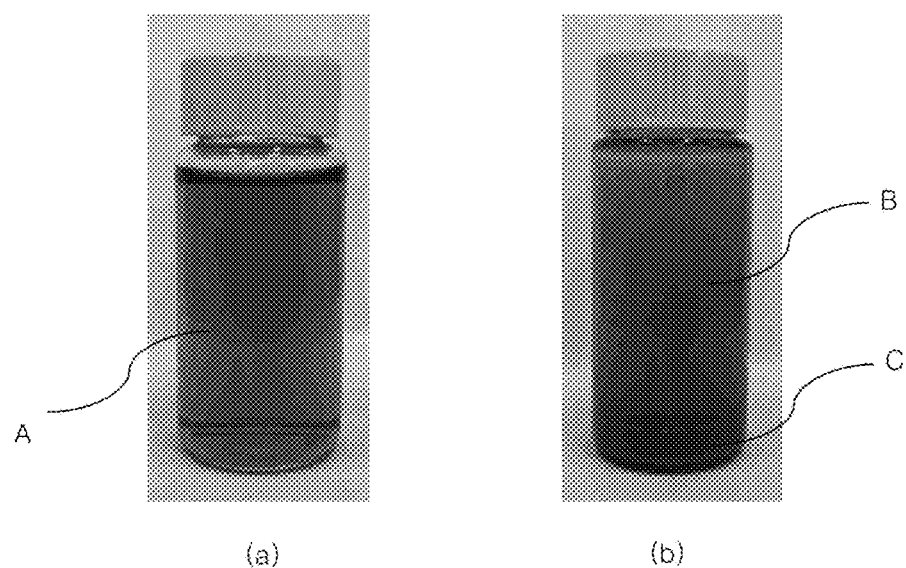
FIG. 9 shows images of the nano-diamond dispersions of FIG. 8.

FIG. 8 illustrates a graph of particle size distribution in a nano-diamond dispersion according to an embodiment of the present invention and a nano-diamond dispersion as a comparative example. FIG. 9 shows images of the nano-diamond dispersions of FIG. 8. The nano-diamond dispersion according to the embodiment of the present invention is a NaOH-nano-diamond dispersion, and the nano-diamond dispersion as a comparative example is a NaCl-nano-diamond dispersion. The graph of FIG. 8 is the results obtained using a nanoparticle size analyzer.

Referring to FIG. 8, the nano-diamond particles in the NaOH-nano-diamond dispersion had an average particle size (e.g., particle diameter) of about 20.4 nm. Nearly no nano-diamond particles having a particle size of 100 nm or greater were found. In some embodiments of the present invention, the NaOH-nano-diamond dispersion may have a particle size (e.g., particle diameter) of from about 1 nm to about 100 nm, and in some other embodiments, may have a particle size of from about 1 nm to about 70 nm. The particle size may refer to the sizes of individual nano-diamond particles, or the sizes of clusters of the nano-diamond particles. A particle size of the nano-diamond particles in the NaCl-nano-diamond dispersion may be from about 200 nm to about 6,000 nm, or may be about 1,280 nm on average. Therefore, the nano-diamond dispersions according to the embodiments of the present invention may have a smaller nano-diamond particle size than the NaCl-nano-diamond dispersions described above as comparative examples.

Referring to FIG. 9, the NaOH-nano-diamond dispersion is seen to be a uniform nano-diamond dispersion (see region A). In addition, the NaCl-nano-diamond is dispersion is separated into a solvent (region B) and a nano-diamond precipitate (region C). The NaOH-nano-diamond dispersion had nearly no change in dispersion stability even after storage for about 60 days or longer. Therefore, the nano-diamond dispersions according to the embodiments of the present invention may provide higher, long-term dispersion stability relative to the NaCl-nano-diamond dispersion using an NaCl solution.

Hereinafter, a nano-diamond dispersion according to an embodiment of the present invention that is prepared from the mixture solution using potassium hydroxide (KOH) as a metal hydroxide, and a nano-diamond dispersion as a comparative example prepared using a potassium chloride (KCl) solution will be described in detail. According to the comparative example, in operation S20 described above, the nano-diamond aggregation was mixed with a potassium chloride (KCl) solution to obtain a mixture solution, followed by operations S30-S60 to obtain the nano-diamond dispersion. A nano-diamond concentration of the nano-diamond dispersion was about 1 wt %. For convenient distinction, the nano-diamond dispersion according to the embodiment of the present invention is referred to as a KOH-nano-diamond dispersion, and the nano-diamond dispersion of the comparative example is referred to as a KCl-nano-diamond dispersion.

Figure 10:
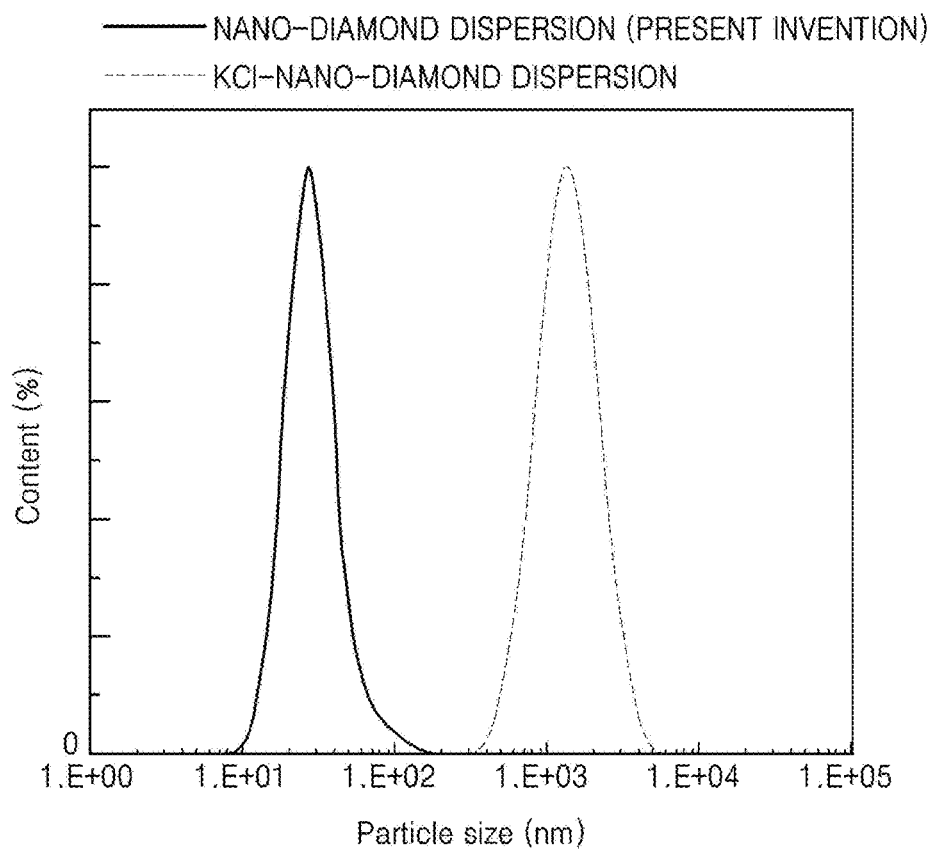
FIG. 10 is a graph of particle size distributions in a nano-diamond dispersion according to an embodiment of the present invention and a nano-diamond dispersion of a comparative example.
Figure 11:
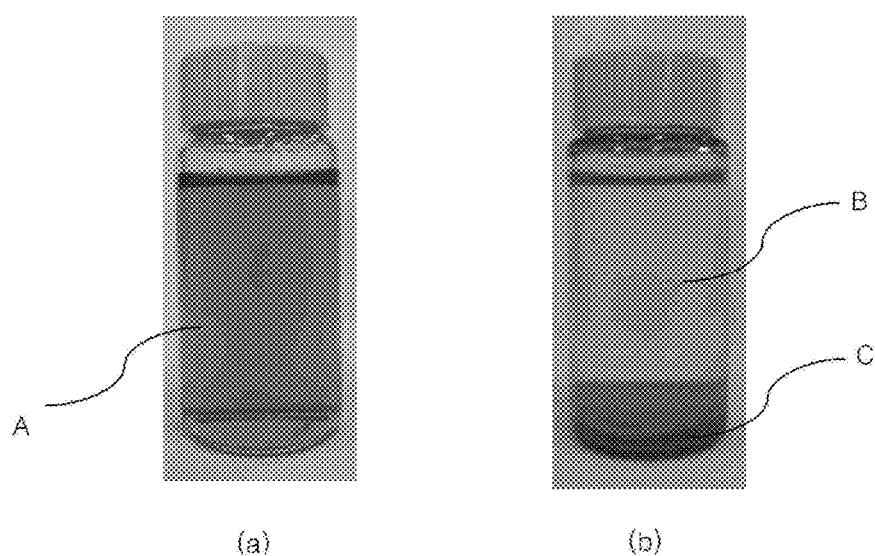
FIG. 11 shows images of the nano-diamond dispersions of FIG. 10.

FIG. 10 is a graph of particle size distributions in a nano-diamond dispersion according to an embodiment of the present invention and a nano-diamond dispersion as a comparative example. FIG. 11 shows images of the nano-diamond dispersions of FIG. 10. The nano-diamond dispersion according to the embodiment of the present invention is a KOH-nano-diamond dispersion, and the nano-diamond dispersion as a comparative example is a KCl-nano-diamond dispersion. The graph of FIG. 10 is the results obtained using a nano particle size analyzer.

Referring to FIG. 10, the nano-diamond particles in the KOH-nano-diamond dispersion had an average particle size (e.g., particle diameter) of about 29.0 nm. Nearly no nano-diamond particles having a particle size of 150 nm or greater were found. In some embodiments of the present invention, the KOH-nano-diamond dispersion may have a particle size (e.g., particle diameter) of from about 1 nm to about 150 nm, and in some other embodiments, may have a particle size of from about 1 nm is to about 100 nm. The particle size may refer to the sizes of individual nano-diamond particles, or the sizes of clusters of the nano-diamond particles. A particle size of the nano-diamond particles in the KCl-nano-diamond dispersion may be from about 400 nm to about 6,000 nm, or may be about 1,450 nm on average. Therefore, the nano-diamond dispersion according to the embodiment of the present invention may have a smaller nano-diamond particle size than the KCl-nano-diamond dispersion described above as a comparative example. In comparison with the graph of FIG. 8, the NaOH-nano-diamond dispersion of FIG. 8 was found to have a smaller particle size than the KCl-nano-diamond dispersion of FIG. 10, indicating that NaOH may have a better nano-diamond dispersing effect than KOH.

Referring to FIG. 11, the KOH-nano-diamond dispersion is seen to be a uniform nano-diamond dispersion (see region A). In addition, the KCl-nano-diamond dispersion is separated into a solvent (region B) and a nano-diamond precipitate (region C). The KOH-nano-diamond dispersion had nearly no change in dispersion stability even after storage for about 60 days or longer. Therefore, the nano-diamond dispersions according to the embodiments of the present invention may provide higher, long-term dispersion stability relative to the KCl-nano-diamond dispersion using a KCl solution.

MODE OF THE INVENTION

The present invention will now be described more fully with reference to an exemplary embodiment using a nano-diamond dispersion according to an embodiment of the present invention described above in a sealing agent. The invention may, however, be embodied in many different forms and should not be construed as being limited to the embodiments set forth below.

An oxide film formed through anodization is porous, highly adsorptive, and apt to be discolored when dyed. To address these drawbacks, anodization involves sealing as a final process. Such an oxide film formed by anodization is initially highly reactive enough to adsorb gas or the like in the air when left alone, to become inactive. For this reason, sealing is performed to stabilize the oxide film. Sealing is performed by is filling pores in the oxide film so as to modify film characteristics in terms of, for example, corrosion resistance. Existing sealing processes may be performed by hydration, by using a metal salt or an organic material, by coating, or the like. In particular, the metal salt sealing using a metal salt is a process of filling pores via a hydrolysis of a metal salt solution having flowed into the holes to form a hydroxide precipitate. As common metal salts for sealing, acid complex of nickel and acid complex of cobalt have been used and these materials are currently listed as environmentally toxic materials and prohibited from use. Therefore, there is a demand for the development of a new sealing technique.

A sealing agent according to an embodiment of the present invention includes a nano-diamond dispersion prepared according to any of the above-described methods and having a nano-diamond particle size of from about 1 nm to about 100 nm. The nano-diamond particles include metal ions and reactive groups chemically bonded to the surfaces thereof. The nano-diamond particles in the sealing agent are fine enough, highly stable, and uniformly dispersed in the nano-diamond dispersion, and thus are suitable to reliably seal pores in an oxide film. Sealing with the sealing agent may improve corrosion resistance of the oxide film, anti-contamination ability, stability of dyed or colored oxide films, and resistance to light (resistance to weather). Furthermore, this may reduce use of environmentally toxic materials used so far.

In some embodiments of the present invention, a nano-diamond dispersion according to any of the above-described embodiments may be used in a polishing agent, an oil additive, a polymer resin additive, and the like. The polishing agent including a nano-diamond dispersion according to any of the embodiments of the present invention may be applicable in, for example, metal processing or when processing a semiconductor wafer. The polishing agent may be used in chemical mechanical polishing (CMP). The polishing agent including the above-described nano-diamond dispersion may reduce unwanted scratching, achieve a high level of flatness, and reduce residual stress.

In some embodiments, the oil additive including the nano-diamond dispersion according to any of the above-described embodiments of the present invention may be a lubricating oil additive used in machines or vehicles. The lubricating oil including the is above-described nano-diamond dispersion may reduce a frictional moment at a contact surface by about 20% to about 40%, consequently suppressing a temperature rise in a contact area and reducing abrasion of mechanical parts.

In some embodiments, the resin additive including a nano-diamond dispersion according to any of the above-described embodiments of the present invention may be a polymer resin additive used in preparing polymer resin, for example, urethane, epoxy, or polyvinylalcohol (PVA). The resin including the above-described nano-diamond dispersion may improve elasticity, heat resistance, cold resistance, and chemical resistance, and reduce a coefficient of friction.

In some embodiments, a heat-dissipating additive including a nano-diamond dispersion according to any of the above-described embodiments of the present invention may appropriately dissipate and hold heat, and thus be applicable as a surface coating material for car radiators, or a heat dissipating material for an LED and a heat-dissipating plate of laptop computers.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the one or more embodiments of the present invention, the nano-diamond dispersion itself may be used as a coating material, a lubricating oil material, a plating material, such as a sealing agent in anodization, or an additive in plating or surface treatment with nickel, chromium, gold, silver, or the like. The nano-diamond dispersion may be added to polymer plastic, a paint additive, a material for heat-dissipating products, polymer plastic, ceramic hybrid, textile, paper, toothpaste, shampoo, soap, cosmetics, or the like to provide functionality. Furthermore, a surface functionalized nano-diamond compound may be used as a starting material in preparing a nanobio material-based pharmaceutical material.

The invention claimed is:

1. A method of preparing a nano-diamond dispersion, the method comprising:
providing a nano-diamond aggregation;
mixing the nano-diamond aggregation and an aqueous metal hydroxide solution while agitating to prepare a mixture solution in order to disintegrate the nano-diamond aggregation;
stabilizing the mixture solution to be separated into a supernatant and a precipitate; and
extracting the supernatant and the precipitate respectively from the mixture solution.

2. The method of claim 1, further comprising, after the extracting of the supernatant and the precipitate from the mixture solution, drying the supernatant to obtain nano-diamond powder; and mixing the nano-diamond powder with a dispersion solvent.

3. The method of claim 1, further comprising, after the extracting of the supernatant and the precipitate from the mixture solution, adding the precipitate back into the mixture solution while agitating.

4. The method of claim 1, wherein the preparing of the mixture solution further comprises disintegrating the nano-diamond aggregation using a centrifuge, a ball mill, a bead mill, or an ultrasonicator.

5. The method of claim 1, wherein the aqueous metal hydroxide solution comprises at least one of potassium (K), calcium (Ca), sodium (Na), magnesium (Mg), aluminum (Al), zinc (Zn), iron (Fe), nickel (Ni), tin (Sn), and lead (Pb).

6. The method of claim 1, wherein the aqueous metal hydroxide solution comprises NaOH, KOH, or a mixture thereof.

7. The method of claim 1, wherein the preparing of the mixture solution comprises chemically binding a metal ion in the aqueous metal hydroxide solution and a functional group in the nano-diamond aggregation.

8. The method of claim 7, wherein the functional group comprises at least one of a carboxyl group (—COOH), a hydroxyl group (—OH), an alcohol group ($CH_2OH$), an amine group ($—NH_2$), an amide group (—$NHCOCH_3$), an amide group (—CONH), a sulfone group ($COSO_3H$), a sulfonyl chloride group ($COSO_2Cl$), a methyl group (—$CH_3$), an aldehyde group (—CHO), and an ether group (—O—).

* * * * *

UNITED STATES PATENT AND TRADEMARK OFFICE
CERTIFICATE OF CORRECTION

PATENT NO. : 9,096,438 B2  
APPLICATION NO. : 13/578424  
DATED : August 4, 2015  
INVENTOR(S) : Park et al.

Page 1 of 1

It is certified that error appears in the above-identified patent and that said Letters Patent is hereby corrected as shown below:

In the claims,

In claim 8, column 12, line 48, please replace "(CH2OH)" with --(CH$_2$OH)--

In claim 8, column 12, line 49, please replace "(—NH2)" with --(—NH$_2$)-- and "(—NHCOCH3)" with --(—NHCOCH$_3$)--

In claim 8, column 12, line 50, please replace "(COSO3H)" with --(COSO$_3$H)--

In claim 8, column 12, line 51, please replace "(COSO2Cl)" with --(COSO$_2$Cl)-- and "(—CH3)" with --(—CH$_3$)--

Signed and Sealed this  
Tenth Day of May, 2016

Michelle K. Lee  
*Director of the United States Patent and Trademark Office*